United States Patent
Akiyama (10) Patent No.: US 10,948,383 B2
(45) Date of Patent: Mar. 16, 2021

(54) METHOD FOR CONTROLLING ENGINE BENCH SYSTEM

(71) Applicant: MEIDENSHA CORPORATION, Tokyo (JP)

(72) Inventor: Takao Akiyama, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 16/965,530

(22) PCT Filed: Nov. 22, 2018

(86) PCT No.: PCT/JP2018/043221
§ 371 (c)(1),
(2) Date: Jul. 28, 2020

(87) PCT Pub. No.: WO2019/146234
PCT Pub. Date: Aug. 1, 2019

(65) Prior Publication Data
US 2021/0003479 A1 Jan. 7, 2021

(30) Foreign Application Priority Data
Jan. 29, 2018 (JP) ................................ 2018-012857

(51) Int. Cl.
*G01M 15/02* (2006.01)
*G01M 15/04* (2006.01)

(52) U.S. Cl.
CPC ............ *G01M 15/02* (2013.01); *G01M 15/04* (2013.01)

(58) Field of Classification Search
CPC .............................. G01M 15/02; G01M 15/04
(Continued)

(56) References Cited

U.S. PATENT DOCUMENTS

2018/0003589 A1   1/2018  Akiyama et al.

FOREIGN PATENT DOCUMENTS

JP   2003207420 A   *  7/2003
JP       4591176    * 10/2010
(Continued)

OTHER PUBLICATIONS

Notice of Decision to Grant a Patent dated Feb. 19, 2019 issued in JP Application No. 2018-012857.
(Continued)

*Primary Examiner* — Eric S. McCall
*Assistant Examiner* — Timothy P Graves
(74) *Attorney, Agent, or Firm* — Muncy, Geissler, Olds & Lowe, P.C.

(57) ABSTRACT

This method for controlling an engine bench system is provided with: a speed control step in which speed control of a dynamometer is executed while an engine is maintained in a non-ignition state, and in which the speed control is ended when the rotational speed of the dynamometer has increased to a prescribed speed; a measuring step in which a shaft torque detection signal is acquired during a period from when, as a result of inertia, the rotational speed of the dynamometer is a prescribed measuring start speed until said rotational speed reaches a prescribed measuring end speed; a frequency analyzing step in which the frequency of the signal having the strongest intensity, from among the shaft torque detection signals acquired in the measuring step, is acquired as a resonant frequency; a design step in which a control gain of a dynamometer control device is determined using the acquired resonant frequency.

1 Claim, 9 Drawing Sheets (58) Field of Classification Search
USPC ............... 73/116.01–116.02, 116.05–116.06,
73/116.11, 118.01–118.02
See application file for complete search history.

(56) References Cited

FOREIGN PATENT DOCUMENTS

| | | |
|---|---|---|
| JP | 2011-145081 A | 7/2011 |
| JP | 5136247 B | 2/2013 |
| JP | 2016-130665 A | 7/2016 |

OTHER PUBLICATIONS

International Search Report (with English translation) and Written Opinion dated Feb. 19, 2019 issued in corresponding Application No. PCT/JP2018/043221.

* cited by examiner

METHOD FOR CONTROLLING ENGINE BENCH SYSTEM

TECHNICAL FIELD

The present invention relates to a method for controlling an engine bench system.

BACKGROUND ART

An engine bench system includes a test piece configured by combining an engine and a transmission thereof, a dynamometer coupled via a coupling shaft to this test piece, an engine control device which controls the throttle aperture of the engine, and a dynamometer control device which controls the dynamometer. In the engine bench system, by executing speed control, torque control or the like of a dynamometer by the dynamometer control device, while controlling the output of the engine by the engine control device, testing for measuring performance such as the durability, fuel economy and exhaust purification performance of an engine is carried out.

In such an engine bench system, the engine and the dynamometer are coupled via a transmission. In addition, since the clutch included in the transmission has non-linear spring stiffness, the mechanical resonance point thereof varies according to the load torque. In addition, with an actual engine, a pulsating torque which oscillates at a variable frequency according to the engine revolution speed occurs. Therefore, Patent Document 1 shows a dynamometer control device which controls the speed of a dynamometer while suppressing resonance, so that the mechanical system is not damaged due to this pulsating torque.

With the dynamometer control device of Patent Document 1, using a shaft torque estimated value calculated using a shaft torque detection value detected using a shaft torque sensor and/or an engine torque map, the mechanical resonance frequency which varies according to load as mentioned above is sequentially calculated, and gain schedule is performed so as to become a control gain according to the calculated mechanical resonance frequency. According to the dynamometer control device of Patent Document 1, by changing the control gain according to the mechanical resonance frequency which varies in response to load, it becomes possible to control the speed of the dynamometer while suppressing the resonance by the clutch.

Patent Document 1: Japanese Patent No. 5136247

DISCLOSURE OF THE INVENTION

Problems to be Solved by the Invention

However, with the control method of Patent Document 1, it is necessary to specify the relationship between the magnitude of shaft torque and the mechanical resonance frequency by carrying out preliminary experiments, and to further construct a map, table or the like defining this relationship, and thus it requires time before even starting testing. In addition, the work for such preliminary experiments, construction of a map, etc. must be performed every time changing the test piece, and thus has low convenience. In addition, with the control method of Patent Document 1, since it is necessary to perform computation for calculating the mechanical resonance frequency and computation to determine the control gain every control cycle, the computational load on the dynamometer control device is high.

The present invention has an object of providing a method for controlling an engine bench system which can suppress resonance with a simple preliminary experiment and low computational load.

Means for Solving the Problems

An engine bench system (for example, the engine bench system 1 described later) according to a first aspect of the present invention includes: a dynamometer (for example, the dynamometer 2 described later) coupled with a test piece (For example, the test piece W described later) that includes an engine (for example, the engine E described later) via a coupling shaft (for example, the coupling shaft S described later), a shaft torque sensor (for example, the shaft torque sensor 61 described later) which generates a shaft torque detection signal according to shaft torque generated at the coupling shaft, and a dynamometer control device (for example, the dynamometer control device 5 described later) which controls the dynamometer based on the shaft torque detection signal. A method for controlling the engine bench system according to the present invention includes: a speed control step (for example, the speed control step of Step S2 in FIG. 4 described later) of executing speed control of the dynamometer while maintaining the engine in a non-ignition state, and ending the speed control when a revolution speed of the dynamometer rises up to a predetermined speed; a measurement step (for example, the measurement steps of Steps S3 and S5 in FIG. 4 described later) of acquiring a shaft torque detection signal in a period from when the revolution speed of the dynamometer is a predetermined measurement start speed until reaching a predetermined measurement end speed by way of inertia; a frequency analysis step (for example, the frequency analysis step of Step S5 in FIG. 4 described later) of acquiring a frequency of a signal having the strongest intensity among shaft torque detection signals obtained in the measurement step, as a resonance frequency; a design step of determining a control gain of the dynamometer control device using the resonance frequency; and a dynamometer control step (for example, the step of Step S6 in FIG. 4 described later) of controlling the dynamometer using the dynamometer control device for which the control gain is determined.

Effects of the Invention

With the control method of the first aspect of the present invention, first, speed control of the dynamometer is executed while maintaining the engine in a non-ignition state, and speed control is ended when the revolution speed of the dynamometer has risen up to a predetermined speed, and then the revolution speed of the dynamometer is allowed to decline by way of inertia. In addition, the shaft torque detection signal is acquired in a period from when the revolution speed of the dynamometer is the measurement start speed until reaching a predetermined measurement end speed, and the frequency of a signal having the strongest intensity among the shaft torque detection signals obtained in this period is acquired as the resonance frequency. However, the variable frequency of the pulsating torque generated by a common 4-stroke engine is fixed according to the engine revolution speed and number of cylinders; however, the torque fluctuation of such variably frequency occurs even when the engine is in the non-ignition state due to the inertial fluctuation torque accompanying the up/down motion of pistons. For this reason, while the revolution speed of the dynamometer is declining from the measurement start speed until reaching the measurement end speed by way of inertia in the above-mentioned way, the shaft torque fluctuation of the coupling shaft also increases when the engine revolution speed, and consequently, the variable frequency which declines according to the engine revolution speed, passes through the resonance frequency which is unknown. Therefore, in the above described way, it is appropriate for the frequency acquired from the shaft torque detection signal to be defined as the resonance frequency when the engine is in the non-ignition state, i.e. load is the lowest. In addition, with the control method of the present invention, determines the control gain of the dynamometer control device using the resonance frequency acquired by a simple preliminary experiment in the above-mentioned way, and controls the dynamometer using this dynamometer control device. Therefore, according to the present invention, it is possible to control a dynamometer while suppressing the resonance with a simple preliminary experiment and low computation load.

PREFERRED MODE FOR CARRYING OUT THE INVENTION

Figure 1:
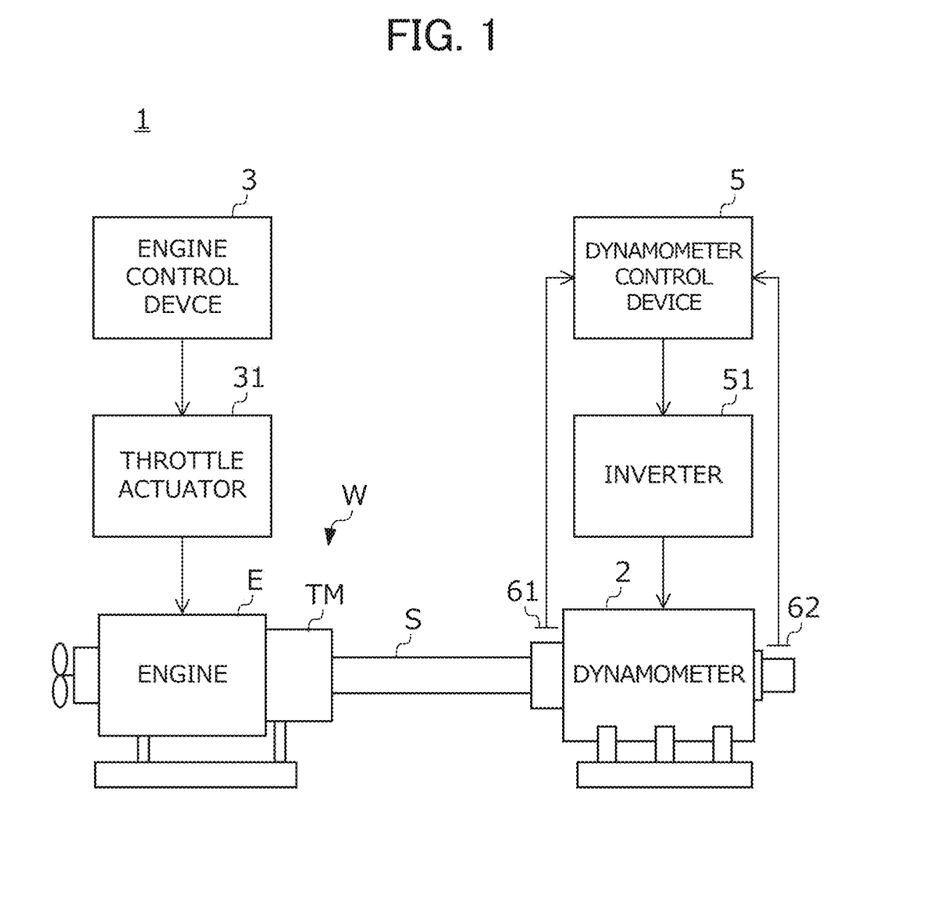
FIG. 1 is a view showing the configuration of an engine bench system to which the control method according to an embodiment of the present invention is applied.

Hereinafter, an embodiment of the present invention will be explained in detail while referencing the drawings. FIG. 1 is a view showing the configuration of an engine bench system 1 to which a control method according to the present embodiment is applied.

The engine bench system 1 is used upon evaluating various performances of a test piece W configured by combining an automobile engine E and a transmission TM thereof. The engine bench system 1 includes: a dynamometer 2 coupled with the test piece W via a coupling shaft S; an engine control device 3 which controls output of the engine E; a dynamometer control device 5 which controls output of the dynamometer 2; a throttle actuator which controls, in accordance with a throttle aperture command signal sent from the engine control device 3, the throttle aperture of the engine E so that this command is realized; an inverter 51 which supplies, in accordance with a torque current command signal sent from the dynamometer control device 5, electric power to the dynamometer 2 so that this command is realized; a shaft torque sensor 61 which detects torsional torque (hereinafter referred to as "shaft torque") of the coupling shaft S; and a revolution speed detector 62 which detects the revolution speed of the output shaft of the dynamometer 2.

The shaft torque sensor 61 generates a shaft torque detection signal according to the shaft torque generated by the coupling shaft S, and sends this signal to the dynamometer control device 5. The revolution speed detector 62 is an encoder, for example, and generates a revolution speed detection signal, which is a pulse signal according to the revolution speed of the output shaft of the dynamometer 2, and sends this signal to the dynamometer control device 5.

The engine control device 3 generates a throttle aperture command signal in a predetermined mode, and controls the output of the engine E by inputting this throttle aperture command signal to the throttle actuator 31. The dynamometer control device 5 defines a shaft torque detection signal sent from the shaft torque sensor 61, revolution speed detection signal sent from the revolution speed detector 62, etc. as inputs, generates a torque current command signal by performing feedback control using the control circuit shown in FIG. 3 described later, and inputs this torque current command signal to the inverter 51, thereby controlling the torque and/or speed of the dynamometer 2.

With the engine bench system 1, testing to evaluate the durability, fuel efficiency, exhaust purification performance, etc. of a test piece W is performed by controlling the output of the engine E under the control of the engine control device 3, and applying a load to the test piece W by controlling the torque or speed of the dynamometer 2 under the control of the dynamometer control device 5.

Figure 2:
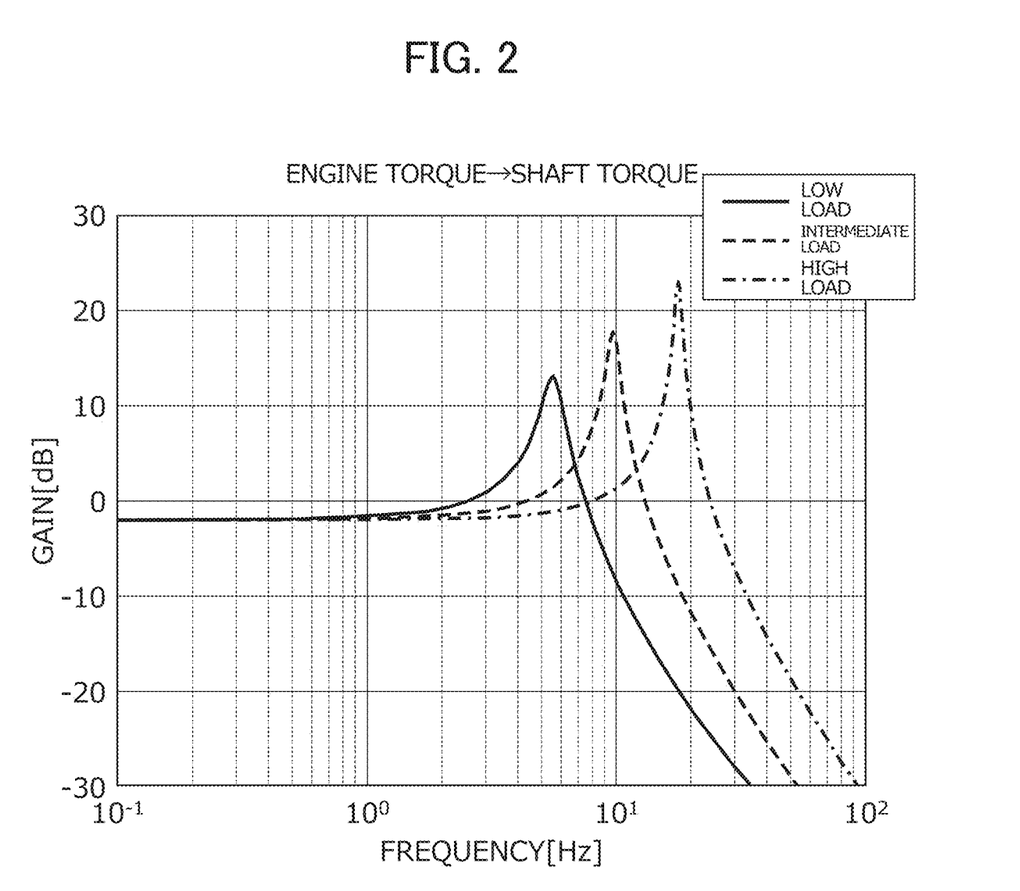
FIG. 2 is a graph showing a frequency response characteristic of a shaft torque detection signal relative to the engine torque in the engine bench system.

FIG. 2 is a graph showing the mechanical characteristic of the engine bench system 1 having a mechanical configuration established by coupling the engine E and dynamometer 2 via the transmission TM and coupling shaft S in the aforementioned way. More specifically, FIG. 2 is a graph showing the frequency response characteristic of a shaft torque detection signal relative to engine torque (i.e. throttle aperture command signal) in the engine bench system 1. In FIG. 2, the load torque on the test piece W is changed in three stages (low load, intermediate load, high load), and the response characteristics of shaft torque under each load torque is shown by changing the line type.

With the engine bench system 1, a resonance phenomenon in which the shaft torque increases at a predetermined resonance frequency occurs as shown in FIG. 2, due to coupling the engine E and dynamometer 2 which are inertia bodies, by the transmission TM and coupling shaft S having a spring characteristic. In addition, since the spring stiffness of the clutch included in the transmission TM exhibits a non-linear change according to load torque, the resonance frequency changes according to load torque as shown in FIG. 2. FIG. 2 shows an example in which the resonance frequency changes between several [Hz] to about 20 [Hz]. With the dynamometer control device 5, it is necessary to control the torque or speed of the dynamometer 2 while suppressing such resonance.

Figure 3:
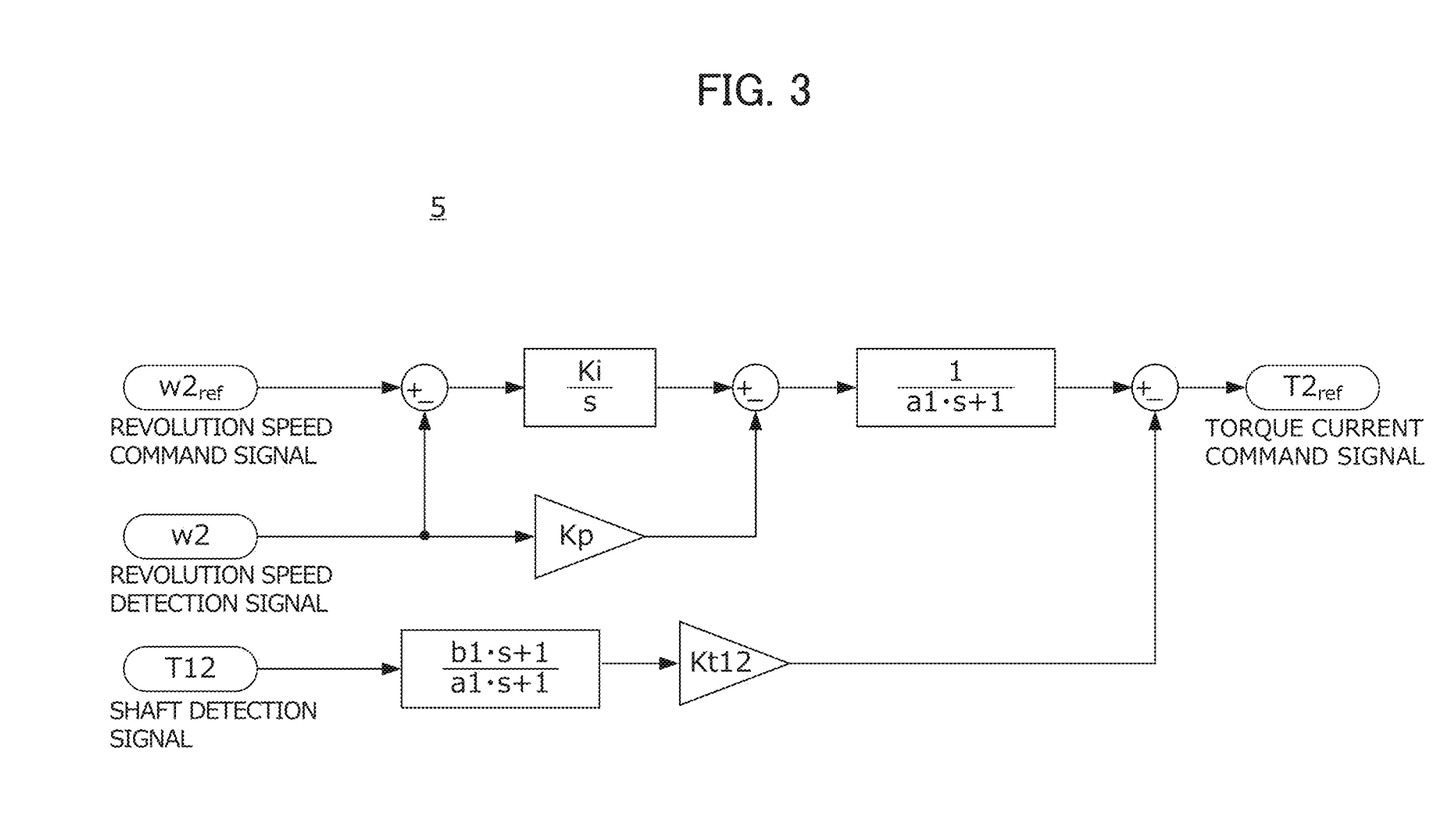
FIG. 3 is a view showing an example of a control circuit of a dynamometer control device.

FIG. 3 is a view showing an example of a control circuit of the dynamometer control device 5. With the dynamometer control device 5, a torque current command signal is generated by inputting to the control circuit such as that shown in FIG. 3 a revolution speed detection signal, a revolution speed command signal which is a higher-order command signal generated by a higher-order command device (not shown) and corresponding to a target relative to the revolution speed detection signal, and a shaft torque detection signal, and this is inputted to the inverter 51.

More specifically, when defining the value of the revolution speed command signal as "$w2_{ref}$", defining the value of the revolution speed detection signal as "$w2$", defining the value of the shaft torque detection signal as "$T12$", defining the value of the torque current command signal as "$T2_{ref}$" and defining the Laplace operator as "$s$", the dynamometer control device 5 generates a torque current command signal in accordance with the following Formula (1).

$$T2_{ref} = \left(\frac{1}{a1 \cdot s + 1}\right) \cdot \left(\frac{Ki}{s} \cdot (w2_{ref} - w2) - Kp \cdot w2\right) - Kt12 \cdot \left(\frac{b1 \cdot s + 1}{a1 \cdot s + 1}\right) \cdot T12 \quad (1)$$

In the above Formula (1), "$Ki$", "$Kp$", "$Kt12$", "$b1$" and "$a1$" are respectively control gains. The value of each control gain is decided in accordance with the following Formulas (2-1) to (2-5), respectively.

$$Ki = \frac{J \cdot wp^2}{c4} \quad (2-1)$$

$$Kp = \frac{c1 \cdot J \cdot wp}{c4} \quad (2-2)$$

$$Kt12 = -\left(\frac{1 + (-c2 + c4) \cdot j2}{c4 \cdot j1 \cdot j2}\right) \quad (2-3)$$

$$b1 = \frac{c1 + (-c3 + c5) \cdot j2}{(1 + (-c2 + c4) \cdot j2) \cdot wp} \quad (2-4)$$

$$a1 = \frac{c5}{c4 \cdot wp} \quad (2-5)$$

The dynamometer control device 5 treats the test piece W and dynamometer 2 as inertia bodies having predetermined moments of inertia, respectively, treats the transmission TM and coupling shaft S as spring elements having predetermined spring stiffness, and treats the mechanical system of the engine bench system 1 as a two-inertia system coupling these two inertia bodies by spring elements.

In the above Formulas (2-1) to (2-5), "$J$" corresponds to the sum of the moment of inertia of the test piece W and the moment of inertia of the dynamometer 2 (hereinafter also referred to as "total inertia"), the value thereof is decided by the following Formula (3-1), when defining the value of the moment of inertia of the test sample W as "$J1$", and defining the moment of inertia of the dynamometer 2 as "$J2$". In addition, in the above Formulas (2-1) to (2-5), "$j1$" and "$j2$" correspond to the ratio of the moment of inertia of the test piece W to the total inertia, and the ratio of the moment of inertia of the dynamometer 2 to the total inertia, respectively, and the value of each is decided by the following Formulas (3-2) and (3-3), respectively. It should be noted that, for the value J1 of the moment of inertia of the test piece W and the value J2 of the moment of inertia of the dynamometer 2, a value identified by performing experiments in advance can be used.

$$J = J1 + J2 \quad (3-1)$$

$$j1 = \frac{J1}{J} \quad (3-2)$$

$$j2 = \frac{J2}{J} \quad (3-3)$$

In addition, in the above Formulas (2-1) to (2-5), "$wp$" corresponds to the resonance frequency of the engine bench system 1. Therefore, when regarding the engine bench system 1 as a two-inertia system as described above, the value of the resonance frequency wp thereof is decided by the following Formula (4), for example, when defining the value of spring stiffness as "$K12$". However, since the spring stiffness of the clutch included in the transmission TM exhibits non-linear change in relation to load torque on the test piece W, in order to specify the value of the resonance frequency wp based on the following Formula (4), it is necessary to perform preliminary experiments using the actual machine, and examine the correlation between the resonance frequency and load torque, which takes time and effort. Therefore, as the specific value of the resonance frequency wp in the present embodiment, a value obtained through the procedure shown in FIG. 4 described later is used without using the theoretical formula of Formula (4) below.

$$wp = \sqrt{K12\left(\frac{1}{J1} + \frac{1}{J2}\right)} \quad (4)$$

In addition, "$c1$", "$c2$", "$c3$", "$c4$" and "$c5$" in the above Formulas (2-1) to (2-5), when generating the torque current command signal in accordance with the above Formula (1), are each coefficients introduced in order to tune the respective control gains ($Ki$, $Kp$, $Kt12$, $b1$, $a1$) so that a preferred resonance suppression effect is obtained. More specifically, these coefficients ($c1$, $c2$, $c3$, $c4$, $c5$) correspond to coefficients of first order, second order, third order, fourth order and fifth order terms of the Laplace operator s, in the closed loop characteristic polynomial $P(s)$ derived using the above Formula (1) and equation of motion of the two-inertia system (refer to Formula (5) below). It should be noted that, since a specific procedure determining the values of these coefficients ($c1$, $c2$, $c3$, $c4$, $c5$) is shown in Japanese Patent No. 5136247 by the applicants of the present disclosure so that a preferred resonance suppression effect is obtained by the dynamometer control device 5, a detailed explanation thereof will be omitted herein.

$$P(s) = 1 + c1 \cdot s + c2 \cdot s^2 + c3 \cdot s^3 + c4 \cdot s^4 + c5 \cdot s^5 \quad (5)$$

Figure 4:
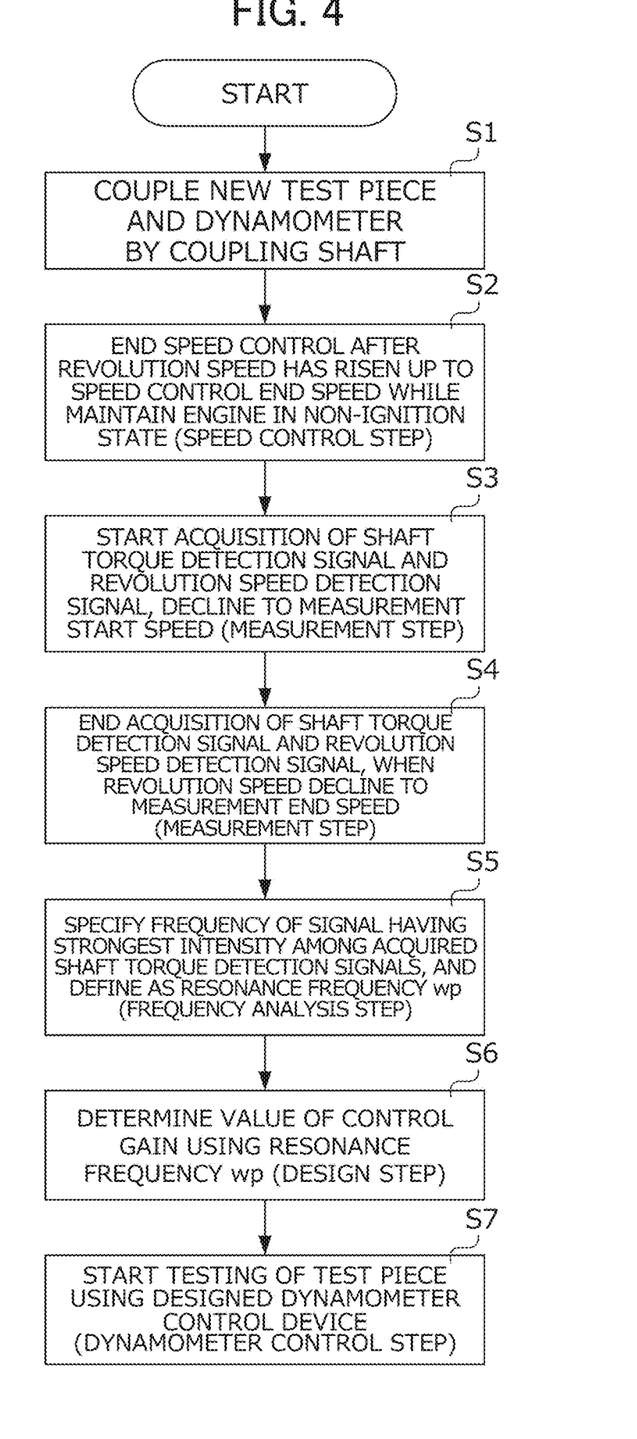
FIG. 4 is a flowchart showing a sequence after setting a new test piece in the engine bench system until starting testing using the dynamometer control device.

FIG. 4 is a flowchart showing the specific sequence of the control method according to the present embodiment. More specifically, FIG. 4 is a flowchart showing the sequence after setting a new test piece W for which the resonance frequency thereof is unknown in the engine bench system 1, until starting testing using the dynamometer control device 5.

In the aforementioned way, it is necessary to determine the values of the control gains ($Ki$, $Kp$, $Kt12$, $b1$, $a1$) in order to perform speed control of the dynamometer 2 in the dynamometer control device 5 based on the control circuit of FIG. 3. In addition, in order to determine the values of these control gains ($Ki$, $Kp$, $Kt12$, $b1$, $a1$), it is necessary to determine the value of the resonance frequency wp, in addition to the various control parameters (J, J1, J2, c1, c2, c3, c4, c5) which are already known. With the control method according to the present embodiment, speed control by the dynamometer control device 5 is started after determining the value of the resonance frequency wp according to the sequence shown in FIG. 4.

First, in Step S1, the operator couples the test piece W which is newly prepared and the dynamometer 2 by the coupling shaft S, and then advances to Step S2.

Next, in the speed control step shown in Step S2, the operator causes both the revolution speed of the engine E and the revolution speed of the dynamometer 2 to rise, by executing speed control of the dynamometer 2 using the dynamometer control device 5, while maintaining the engine E of the test piece W in a non-ignition state. In addition, in this speed control step, the speed control by the dynamometer control device 5 is ended, when the revolution speed of the dynamometer 2 has risen to a predetermined speed control end speed. It should be noted that, after ending speed control, the engine E and dynamometer 2 continue to coast for a while, while causing the revolution speed thereof to gradually decline. It should be noted that this speed control step may perform speed control of the dynamometer 2 using a control circuit prepared separately from the control circuit shown in FIG. 3, or may perform speed control of the dynamometer 2 using the control circuit shown in FIG. 3, under the resonance frequency wp decided with a tentative value.

However, a common 4-stroke engine generates pulsating torque with the variable frequency of (engine revolution speed [rpm]/60)*(cylinder number/2) as the main component. In addition, the torque fluctuation of such variable frequency occurs even if the engine E is the non-ignition state, by the inertial fluctuation torque accompanying the up/down motion of the pistons. Therefore, the above-mentioned speed control end speed is set as the speed (for example, 1500 [rpm]) at which it is estimated that the variable frequency of the torque fluctuation occurring in the engine E under the speed control of the dynamometer 2 becomes sufficiently higher than the upper limit of the resonance frequency decided according to experience.

Next, Step S3 starts the acquisition of the shaft torque detection signal and revolution speed detection signal, in response to the revolution speed of the dynamometer 2 which continues to rotate by inertia falling below a predetermined measurement start speed in Step S2 and later. Herein, the measurement start speed is a speed somewhat lower than the above-mentioned speed control end speed, and is set as a speed (for example, 1000 [rpm]) at which it is estimated that the variable frequency of the engine becomes higher than the upper limit of the above-mentioned resonance frequency.

Next, Step S4 ends the acquisition of the shaft torque detection signal and revolution speed detection signal started in Step S3, in response to the revolution speed of the dynamometer 2 which continues to rotate by inertia declines to the predetermined measurement end speed. Herein, the measurement end speed is a speed sufficiently lower than the above-mentioned measurement start speed, and is set as a speed (for example, 0 [rpm]) at which it is estimated that the variable frequency of the engine E will be sufficiently lower than the lower limit of the resonance frequency decided according to experience. In other words, the processing of Steps S3 and S4 corresponds to measurement steps in the control method of the present invention.

Next, in the frequency analysis step of Step S5, the operator specifies the frequency of the signal having the strongest intensity among the shaft torque detection signals acquired in the measurement steps of Steps S3 and S4, and defines this specified frequency as the resonance frequency wp. More specifically, in this frequency analysis step, the frequency of the signal having the strongest intensity is specified by conducting known frequency analysis (i.e. wavelet analysis, for example), on the shaft torque detection signals from the measurement start speed until reaching the measurement end speed acquired in the above-mentioned measurement step.

Even when the engine E is in the non-ignition state in the aforementioned way, inertia fluctuation torque that fluctuates at frequencies according to the engine revolution speed due to up/down motion of pistons occurs. For this reason, it can be considered that the variable frequency passes through the unknown resonance frequency, while decreasing the revolution speed of the engine E from the measurement start speed until the measurement end speed by way of inertia. Therefore, upon the variable frequency passing through the resonance frequency, since it can be considered that the shaft torque fluctuation also increases, it is appropriate to estimate the frequency of the signal having the strongest intensity obtained by performing the frequency analysis step as described above as the resonance frequency. It should be noted that the engine E is in the non-ignition step from Step S3 to S4, and thus the load torque thereof is the smallest. Consequently, the resonance frequency obtained in the frequency analysis step of Step S5 is in the vicinity of the resonance frequency (about 6 [Hz]) during low load indicated by the solid line in the example of FIG. 2.

Figure 5:
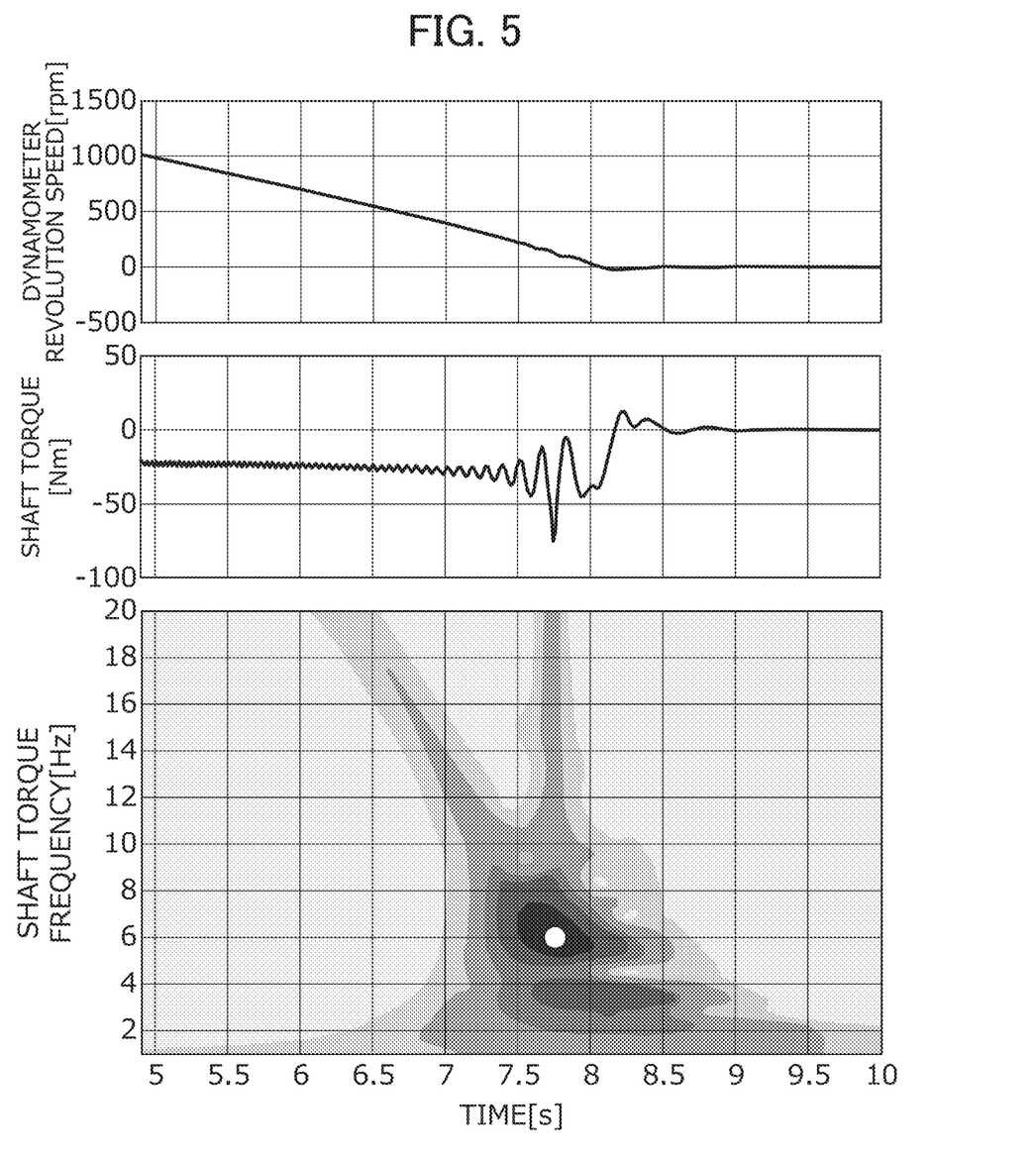
FIG. 5 provides graphs showing a specific example of results of a measurement step and frequency analysis step.

FIG. 5 provides graphs showing a specific example of the results of the measurement step of Steps S3 and S4 and the frequency analysis step of Step S5. The topmost of FIG. 5 shows the revolution speed of the dynamometer obtained in the measurement step, the middle shows the shaft torque obtained in the measurement step, and the bottommost shows the results of weblet analysis in the frequency analysis step. In addition, the horizontal axis in FIG. 5 shows the common time. In addition, defining the vertical axis as the frequency, and defining the horizontal axis as time, the bottommost in FIG. 5 shows the intensity of each frequency component included in the shaft torque detection signal at each time. FIG. 5 illustrates darker as the intensity gets stronger. In addition, among the shaft torque detection signals obtained in the measurement step, the time and frequency at which the signal having the strongest intensity was obtained are shown by a white circle.

As shown in FIG. 5, the measurement step measures the revolution speed and shaft torque in the process of ending the speed control of the dynamometer, and then the revolution speed declines by way of inertia. At this time, even when the engine E is in the non-ignition state, since inertia fluctuation torque occurs by the up/down motion of pistons, the shaft torque oscillates as shown in the middle of FIG. 5. In addition, the variable frequency of this shaft torque becomes smaller as the revolution speeds of the dynamometer 2 and engine E decline.

In addition, as shown in FIG. 5, upon the variable frequency of the shaft torque passing through the resonance frequency during low load which is unknown (in the example of FIG. 5, during time 7.5 to 8) in the course of the revolution speed declining by inertia, the amplitude of shaft torque increases due to resonance. For this reason, in the frequency analysis step, as shown in FIG. 5, the signal having the strongest intensity at the same time is detected, and it is thereby possible to specify the resonance frequency during low load. In addition, the magnitude of the resonance frequency thereby specified is about 6 [Hz] as shown in FIG.

5, and this substantially matches the resonance frequency during low load in the example of FIG. 2.

Referring back to FIG. 4, in the design step of Step S6, by inputting the value of the resonance frequency wp acquired in the frequency analysis step to the above Formulas (2-1) to (2-5), the values of the control gains (Ki, Kp, Kt12, b1, a1) are determined.

Next, in the dynamometer control step of Step S7, the operator starts testing of the test piece W coupled to the dynamometer 2, by controlling the speed of the dynamometer 2 using the dynamometer control device 5 for which the control gains were determined in Step S6.

Next, the effects of the dynamometer control device 5 designed by the sequence of FIG. 4 will be explained while comparing with the conventional technology. Herein, conventional technology refers to a dynamometer control device designed according to the method shown in the fourth embodiment of Japanese Patent No. 5136247 by the applicants of the present disclosure.

Figure 6:
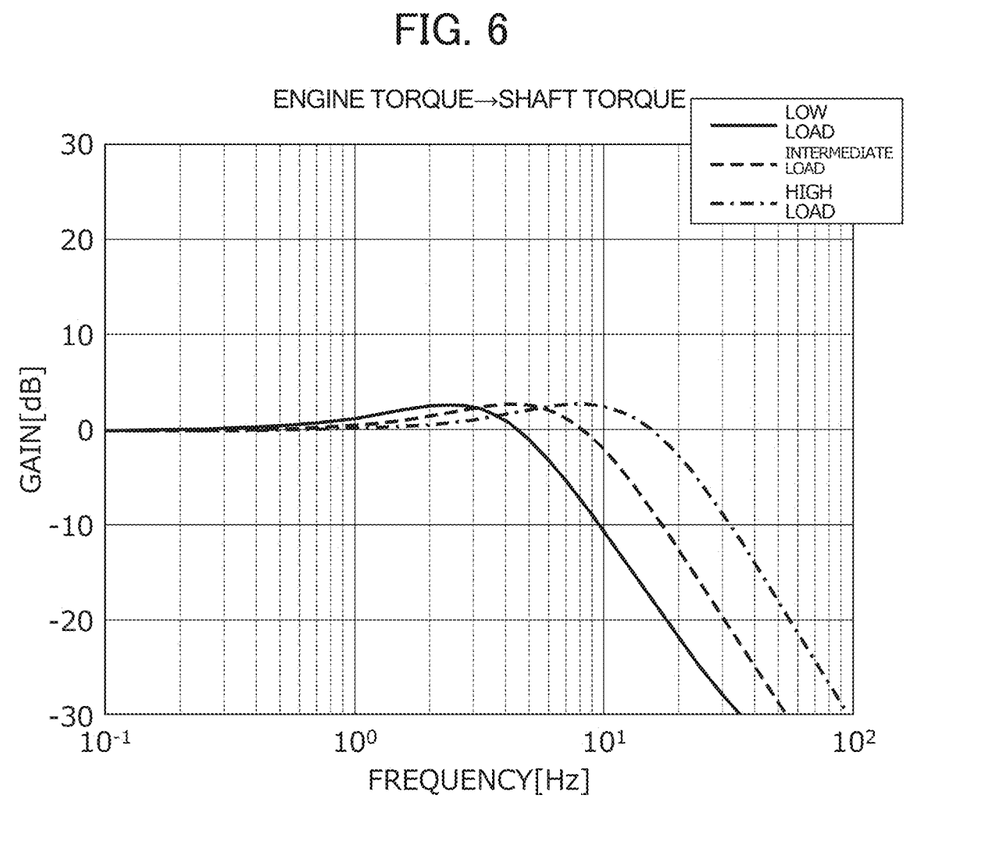
FIG. 6 is a graph showing the frequency response characteristic of the shaft torque detection signal relative to engine torque (conventional technology)
Figure 7:
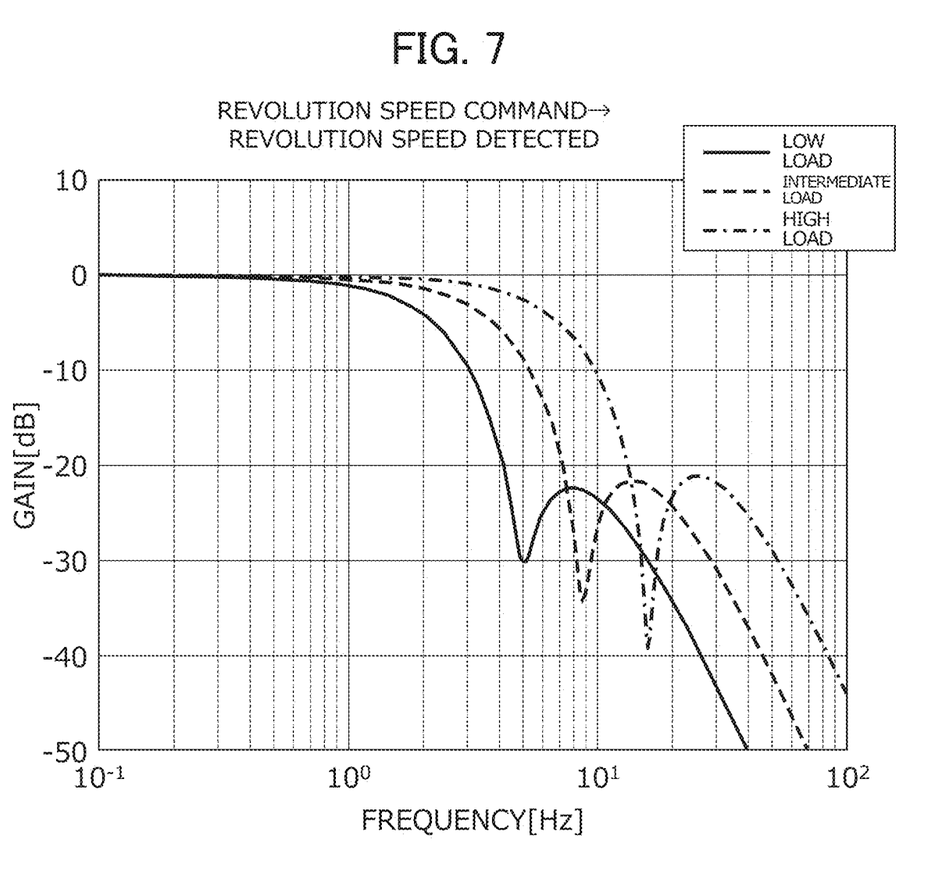
FIG. 7 is a graph showing the frequency response characteristic of the revolution speed detection signal relative to a revolution speed command signal (conventional technology)

FIGS. 6 and 7 are graphs showing the control results by the dynamometer control device of the above-mentioned conventional technology. More specifically, FIG. 6 shows the frequency response characteristic of the shaft torque detection signal relative to engine torque, and FIG. 7 is a graph showing the frequency response characteristic of the revolution speed detection signal relative to the revolution speed command signal.

With the conventional technology in the engine bench system having a non-linear spring property as mentioned above, the control gains are made to change according to the resonance frequency corresponding to the magnitude of shaft torque in every control period. For this reason, as shown in FIG. 6, with the frequency response characteristic of the shaft torque detection signal relative to the engine torque, even in the case of the load torque varying, and the spring stiffness varying, the resonance will be sufficiently suppressed. In addition, as shown in FIG. 7, the frequency response characteristic of the revolution speed detection signal relative to the revolution speed command signal also has a control response depending on the change in resonance frequency. In the above way, although the preferred resonance suppression effect is obtained according to the conventional technology, it is necessary to specify the correlation between the magnitude of shaft torque and the resonance frequency by performing preliminary experiments every time changing the test piece, and thus takes time and effort. In addition, according to the conventional technology, it is necessary to perform computation for calculating the resonance frequency and computation for determining control gains with the dynamometer control device, and thus there is also a problem in that the computational load is high.

Figure 8:
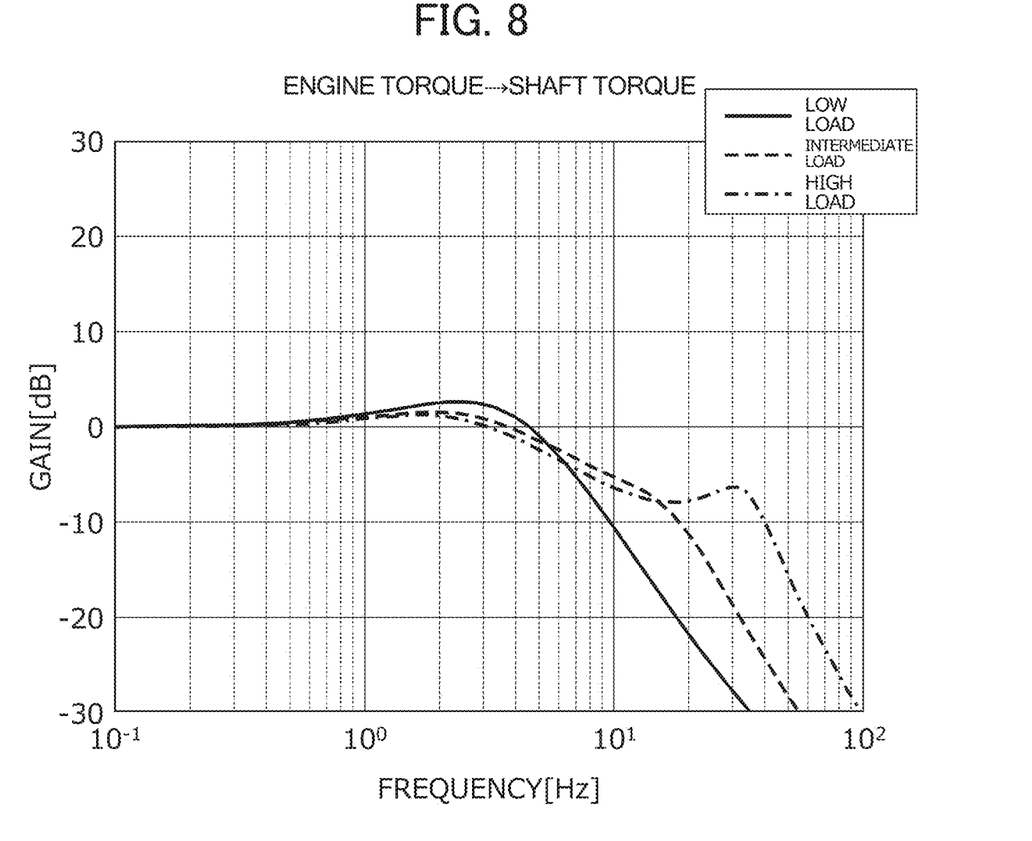
FIG. 8 is a graph showing the frequency response characteristic of the shaft torque detection signal relative to engine torque (present embodiment)
Figure 9:
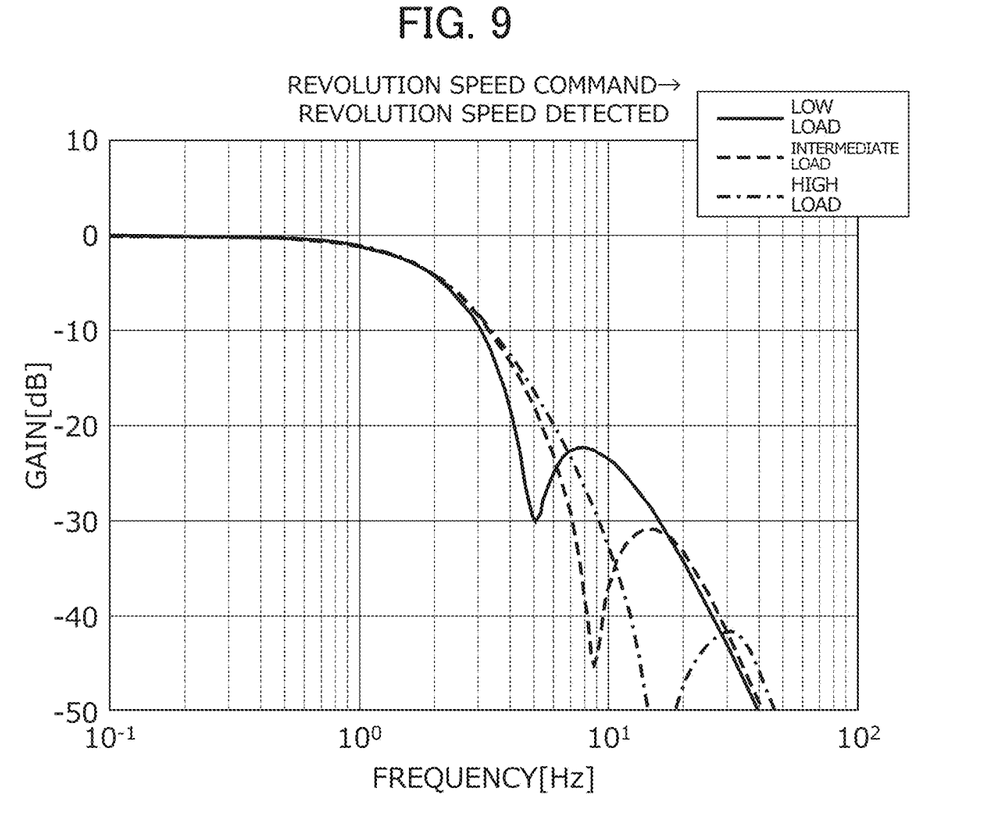
FIG. 9 is a graph showing the frequency response characteristic of the revolution speed detection signal relative to a revolution speed command signal (present embodiment).

FIGS. 8 and 9 are graphs showing the control results by the dynamometer control device 5 designed according to the sequence of FIG. 4. More specifically, FIG. 8 shows the frequency response characteristic of the shaft torque detection signal relative to the engine torque, and FIG. 9 is a graph showing the frequency response characteristic of the revolution speed detection signal relative to the revolution speed command signal.

As shown in FIG. 8, irrespective of the dynamometer control device 5 of the present embodiment fixing the control gains to values set based on the resonance frequency corresponding to during low load contrary to the conventional technology, for the frequency response characteristic of the shaft torque detection signal relative to engine torque, even in a case of the load torque varying, and the spring stiffness varying, the resonance will be sufficiently suppressed. In addition, as becomes clear by comparing FIG. 8 and FIG. 6, the resonance suppression effect obtained by the dynamometer control device 5 of the present embodiment is not inferior compared to the conventional technology. In addition, as shown in FIG. 9, the frequency response characteristic of the revolution speed detection signal relative to the revolution speed command signal will not be a control response depending on a change in resonance frequency, contrary to the conventional technology shown in FIG. 7.

According to the control method of the present embodiment, it is possible to design the dynamometer control device 5 having high resonance suppression effect by simply performing a preliminary experiment (i.e. steps of Steps S1 to S6 of FIG. 4) which is simple compared to the conventional technology. In addition, with the control method of the present embodiment, it is possible to make the computational load of the dynamometer control device 5 lower than the conventional technology, due to fixing the control gains to values set based on the resonance frequency corresponding to during low load.

EXPLANATION OF REFERENCE NUMERALS 1 engine bench system
E engine
W test piece
S coupling shaft
2 dynamometer
5 dynamometer control device
61 shaft torque sensor

The invention claimed is:

1. A method for controlling an engine bench system that includes a dynamometer coupled with a test piece that includes an engine via a coupling shaft, a shaft torque sensor which generates a shaft torque detection signal according to shaft torque generated at the coupling shaft, and a dynamometer control device which controls the dynamometer based on the shaft torque detection signal, the method comprising:
   executing speed control of the dynamometer while maintaining the engine in a non-ignition state, and ending the speed control when a revolution speed of the dynamometer rises up to a predetermined speed;
   acquiring a shaft torque detection signal in a period from when the revolution speed of the dynamometer is a predetermined measurement start speed until reaching a predetermined measurement end speed by way of inertia;
   acquiring a frequency of a signal having the strongest intensity among acquired shaft torque detection signals, as a resonance frequency;
   determining a control gain of the dynamometer control device using the resonance frequency; and
   controlling the dynamometer using the dynamometer control device for which the control gain is determined.

* * * * *